United States Patent
Oehring et al.

[11] Patent Number: 5,971,066
[45] Date of Patent: Oct. 26, 1999

[54] SYSTEM AND METHOD FOR PREVENTION OF WINDSHIELD FOGGING IN A MOTOR VEHICLE

[75] Inventors: Chris George Oehring, Monroe; Mark David McBroom, Redford, both of Mich.; Martin J. Aislabie, Stratford-Upon-Avon, United Kingdom

[73] Assignee: Ford Motor Company, Dearborn, Mich.

[21] Appl. No.: 09/032,453

[22] Filed: Feb. 27, 1998

[51] Int. Cl.⁶ .................................................... B60H 1/00
[52] U.S. Cl. .......................... 165/202; 165/42; 165/232
[58] Field of Search ................................ 165/202, 204, 165/232, 233

[56] References Cited

U.S. PATENT DOCUMENTS

| | | |
|---|---|---|
| 4,417,618 | 11/1983 | Yoshimi et al. . |
| 4,953,630 | 9/1990 | Iida . |
| 5,027,611 | 7/1991 | Doi et al. .............................. 165/202 X |
| 5,051,884 | 9/1991 | Iida . |
| 5,624,310 | 4/1997 | Fredrikson et al. . |
| 5,791,407 | 8/1998 | Hammons ................................ 165/202 |

*Primary Examiner*—Ira S. Lazarus
*Assistant Examiner*—Terrell McKinnon
*Attorney, Agent, or Firm*—James J. Dottavio

[57] ABSTRACT

A method and system for controlling a heating, ventilation and air-conditioning (HVAC) system of a vehicle to prevent fogging of a windshield of the automotive vehicle is provided. The method and system include determination of whether the vehicle has been recently turned "on" and preventing the HVAC system from directing air flow toward the windshield for a first predetermined time period after it has been determined that the vehicle has recently been turned "on".

19 Claims, 3 Drawing Sheets

SYSTEM AND METHOD FOR PREVENTION OF WINDSHIELD FOGGING IN A MOTOR VEHICLE

FIELD OF THE INVENTION

The present invention is related to a system and method for defrosting a windshield in a motor vehicle.

BACKGROUND OF THE INVENTION

Modern motor vehicles are equipped with a windshield defroster which is typically part of the climate control system of the automobile. As described in U.S. Pat. No. 5,624,310, to Fredriksson et al ('310 patent), which is incorporated herein by reference in its entirety, a problem which may occur in such an automobile when the vehicle is operated with the climate control system in an air conditioning or defrost mode, then the vehicle is shut off for a short period of time. When the vehicle is restarted, condensation within the evaporator may be blown onto the windshield and cause a fogging of the windshield. The '310 patent addresses this problem by disabling the climate control fan or blower for a period of time until the evaporator has reached an optimal low temperature.

Applicants believe this approach may lead to customer dissatisfaction because the occupants of the vehicle will detect that the blower motor is not operating and may perceive this to be a defective blower motor. Furthermore, the air conditioner compressor does not operate below a predetermined temperature and the selected mode may not be have the climate control system operate in a mode in which the air conditioning system is activated, in which case the evaporator temperature will not reach the optimal temperature. In either case, the blower may not operate for an unsatisfactory time period.

It would therefore be desirable to provide a system and method for defrosting a windshield in a motor vehicle which does not disable the blower motor and which prevents fogging of the windshield.

SUMMARY OF THE INVENTION

It is thus a general object of the present invention to provide a system and method for defrosting a windshield in a motor vehicle which does not disable the blower motor and which prevents fogging of the windshield In carrying out the above object and other objects, features, and advantages of the present invention, a method and system are provided for controlling a heating, ventilation and air-conditioning (HVAC) system of a vehicle to prevent fogging of a windshield of the automotive vehicle. The method and system determine whether the vehicle has been recently turned "on" and do not permit the HVAC system to direct air flow toward the windshield for a first predetermined time period after it has been determined that the vehicle has recently been turned "on". The system thus prevents moist air from being directed toward the windshield at startup. The system permits the air to be directed toward the windshield after it is determined that the HVAC system is adequately dry, which may occur when the vehicle is shut off for an adequate period, when the ambient temperature is low and when air has blown through the system for an adequate time period.

These and other desired objects of the instant invention will become more apparent in the course of the following detailed description and appended claims. The invention may best be understood with reference to the accompanying drawings wherein illustrative embodiments are shown.

DETAILED DESCRIPTION OF PREFERRED EMBODIMENTS

Figure 1:
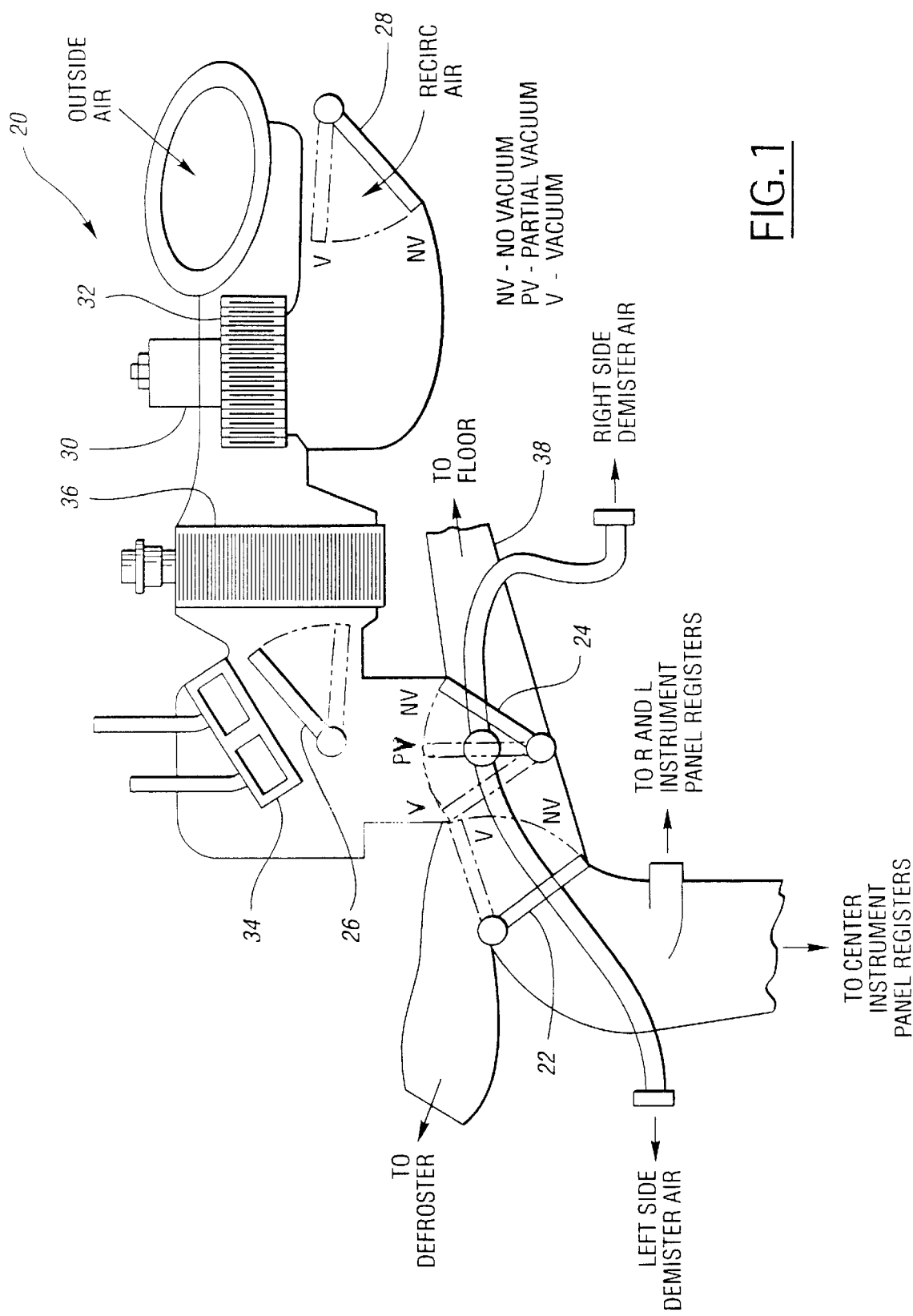
FIG. 1 is a schematic diagram illustrating an air handling system which can be controlled by the method and control system of the present invention.

In general, control of temperature and defrosting of the windshield within an automobile is accomplished using various actuators to adjust the temperature and flow of air supplied to the cabin of the vehicle. FIG. 1 shows schematically an air handling system of an HVAC (heating, ventilation and air conditioning) system, generally indicated at 20. The system 20 includes the arrangement of air flow doors, including panel-defrost, floor-panel, and outside recirculated air actuators or doors 22, 24, and 28, respectively. The doors 22, 24 and 28 are typically driven by vacuum motors (not shown) between their various vacuum, partial vacuum and no vacuum positions in a conventional fashion as indicated in FIG. 1, or may be driven by an electric servo motor. A temperature control door 26 is also provided, and preferably driven by an electric servo motor (not shown) also in a conventional fashion.

The system 20 also includes a variable speed blower motor or fan 30 including a blower wheel 32. The system further includes heating and cooling elements such as a heater core 34 and an evaporator core 36 in a typical vehicle air conditioning plant including a compressor 37. Each of the above components is in communication with the HVAC case and associated ducting 38 in order to control temperature, the direction of air flow and the ratio of fresh air to recirculated air.

Figure 2:
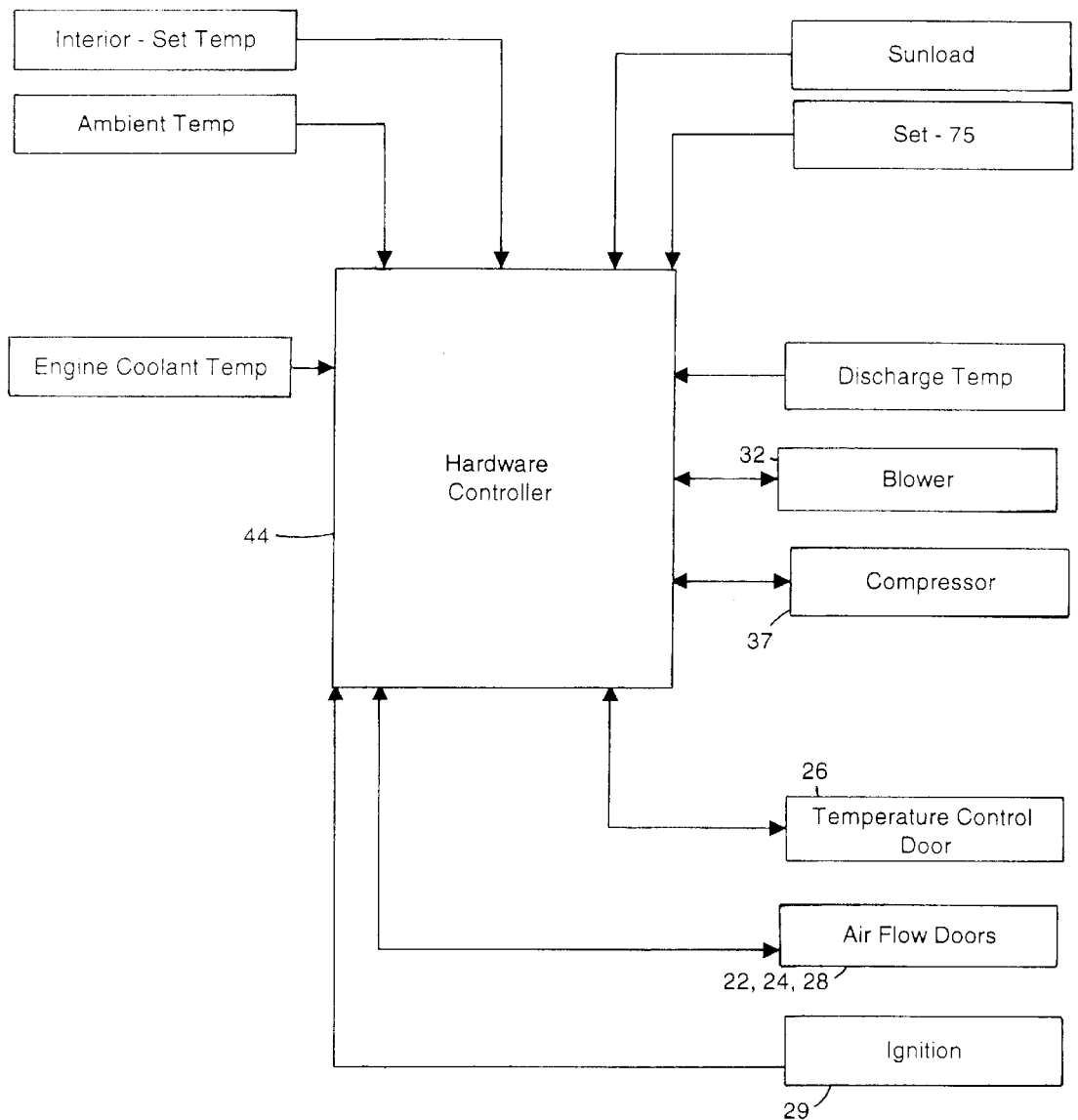
FIG. 2 is a schematic block diagram of the control system of the present invention.

For automatic control of the temperature and flow of air in the cabin, conditions within and outside the cabin are monitored by sensors and an electronic controller generates signals to control the plant actuators according to the conditions as indicated by the sensors. As illustrated in FIG. 2, a typical complement of sensors of the HVAC system provide signals which are representative of interior temperature, ambient (outside) air temperature, engine coolant temperature (ECT), discharge air temperature and sunload. In addition, there is a set signal or set temperature value indicating the desired temperature that is set manually by the driver.

The signals are provided to a hardware controller 44 as inputs. Hardware controller 44, in turn, controls the doors 22 through 28 to regulate the temperature and flow of air and ultimately to maintain the comfort of driver and passengers in the vehicle. The controller 44 also receives signals from the ignition switch 29 and the HVAC system 20 to indicate the operating of the switch 29 and system 20. The controller 44 preferably continually monitors the state of the ignition switch 29 and the state of the HVAC system 20.

Operation of an HVAC system 20 is described in further detail in copending application Ser. No. 08/871,803, assigned to the assignee of the present invention, which is incorporated herein by reference in its entirety.

Figure 3:
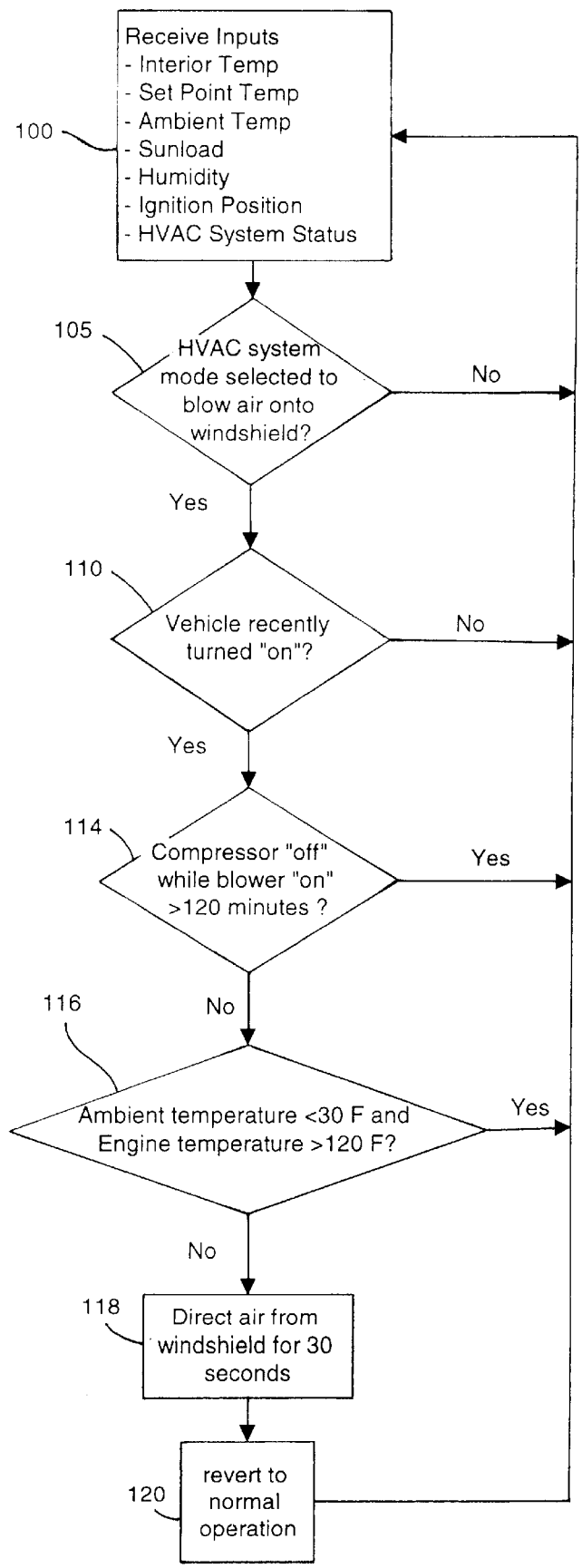
FIG. 3 is a flow diagram illustrating the general sequence of steps associated with the operation of the present invention.

Turning now to FIG. 3, there is shown a flow diagram illustrating the general sequence of steps associated with the method of the present invention. Although the steps shown in FIG. 3 are depicted sequentially, they can be implemented utilizing interrupt-driven programming strategies, object-oriented programming, or the like.

The method begins with the step of receiving a plurality of inputs, as shown at block 100. These inputs may include, but are not limited to, interior temperature, set point (or desired) temperature, ambient temperature, sunload, humidity, vehicle coolant temperature, and ignition position, as sensed by respective sensors. From these inputs, the controller 44 determines in which mode the HVAC system 20 should operate, and whether this mode will direct air to the windshield of the vehicle at 105. If the mode would direct air at the windshield, the controller 44 enters the following tests to determine whether air should be directed away from the windshield until the moist air is purged from the evaporator case and HVAC ducts 38.

If, after the vehicle is recently turned "on", the HVAC system is operating in a mode other than one that directs air to the windshield, this mode is permitted. If the HVAC system later changes to a defrost mode, the following tests are run.

If the HVAC mode would direct air to the windshield, the controller 44 determines whether the vehicle was recently turned "on" 110. If the vehicle had recently been turned "on", the controller 44 may prevent the HVAC system 30 from directing air toward the windshield. If the vehicle has not been recently started, then the HVAC system operates in a normal mode.

If the vehicle had been turned "off", then turned "on", the HVAC system may have experienced a change from a relatively warm to a relatively cool state, thereby making it likely the condenser, air and/or ducts have become laden with moisture.

In a preferred embodiment, the test to determine whether the vehicle has "recently been turned on" 110 is determined by establishing the time since the vehicle was last started, and for what period since the vehicle was last started that the blower motor 30 has operated. If the blower motor 30 has operated for a period of time, in a preferred embodiment 120 minutes, than the controller 44 determines that the vehicle has not been recently been turned "on" (i.e., started) and the HVAC system operates in a normal mode, because the HVAC system should be sufficiently dry to not fog the windshield. Thereafter, the test is not run until the vehicle is restarted.

In an alternative embodiment, the test to determine whether the vehicle has recently been turned "on" includes an alternative test to determine whether the compressor has not been turned "on" for the same period.

As described above, if the vehicle has recently been turned "on" and the air in the HVAC system is moist, the present invention prevents the HVAC system from directing air to the windshield unless the controller 44 determines the HVAC system is adequately "dry" according to one of the following tests. The HVAC system preferably directs air to the floor ducts and may also direct air to the panel ducts.

In a preferred embodiment, in a first test, not illustrated in FIG. 3, the controller may determine the interval for which the vehicle was turned "off" prior to the ignition being turned to the "on" position. If the vehicle was quickly restarted, the controller 44 determines that substantial condensation has not occurred and the system should be dry. In a preferred embodiment, this interval is approximately less than one minute.

In a preferred embodiment, a second test is illustrated at 114 of FIG. 3 to determine whether the HVAC system is adequately dry. In this test 114, the controller 44 determines whether the air conditioning system, including a compressor, was "on" at the time the vehicle was turned "off" and if the air conditioning system was "off", for what period of time the blower 32 operated while the air conditioning system was "off" prior to the vehicle being turned "off" 114. In a preferred embodiment, when the blower 32 operates for a period of approximately 120 minutes with the compressor "off", the system assumes the HVAC system, particularly the case and ductwork, has adequately dried due to the air flow during the period where compressor was "off".

In a further test, not illustrated in FIG. 3, the controller 44 may also determine whether the ambient temperature is below a predetermined temperature, preferably below 30 degrees Fahrenheit. If the temperature is low enough, the controller 44 may determine that the air is dry enough to permit the HVAC system to direct air to the windshield, particularly since a compressor is unlikely to operate at such low temperature.

In yet another test illustrated in FIG. 3 at 116, the controller 44 determines the air is too cold to be directed toward the passenger's feet without inducing passenger discomfort and dissatisfaction. In this test, the controller 44 determines the ambient temperature is below a predetermined level and the vehicle coolant temperature is below a second predetermined level. In a preferred embodiment, if the ambient temperature is below 30 degrees and the coolant is below 120 degree F., the controller 44 determines that the air will be too cool to direct toward the passengers. In this case, the HVAC system is deemed to be adequately dry, since any fogging would be outweighed by the passenger discomfort and since the system is operating in an environment which may not promote condensation or which may encourage evaporation of condensation. In such an instance, the controller 44 assumes insufficient condensation would have occurred to present a fogging problem, or any fogging would be outweighed by the passenger discomfort and air may be directed toward the windshield.

In a further alternative embodiment, a moisture sensor (not shown) is provided within the HVAC system to send a signal to the controller 44. When the controller 44 thereby determines the air within the HVAC system is too moist, air is directed away from the windshield as described above.

In yet another alternative embodiment, the controller 44 assumes the HVAC system is adequately dry if the vehicle is turned off for a substantial amount of time, preferably at least 48 hours. In this embodiment, the controller 44 determines the time differential between the vehicle being turned "off" and "on". In an alternative embodiment, a time period of 12 hours is used.

If the controller 44 determines none of the above conditions are met and the HVAC system is not adequately dry, the controller 44 directs air from the windshield, as illustrated at 118, by setting the air distribution mode to a position which would not blow air to the windshield or side windows, such as "floor", for a predetermined time period. This allows the moisture-laden air to be forced out of the ductwork and case. In a preferred embodiment, the blower operates for approximately 30 seconds before air may be directed to the windshield. After this time expires, the operation returns to a normal operating mode. Preferably, the HVAC system also directs air away from the side window demisters under conditions where fogging may occur, as described above. One skilled in the art recognizes if a "floor" or "Panel" mode was selected prior to a "defrost"

mode, then the blower may have evacuated the moist air from the case and therefore air may be directed toward the windshield. In a preferred embodiment, if the blower is stopped (air is not blown from the system) before the blower operates a cumulative 120 minutes, the present tests are run.

The present invention is preferably used in a vehicle which includes an Electronic Automatically Temperature Controlled (EATC) climate control system. However, the present invention may be adapted to operate with a manual system, utilizing a controller to control the air flow away from the windshield under the conditions described above. One example would include prohibiting the driver from selecting defrost under the above tests, or providing an indicator (i.e., an "idiot light") to warn the operator when defrost is selected, or by providing automated door control without a full EATC system (driver selects blower speed and desired mode).

The system described above controls the blower with tests which include discrete, or nonvariable, parameters. In yet a further embodiment, the principles described above are applied to a variable configuration. For example, if the blower has operated for a period of 60 minutes (versus 120 in the test above), when a defrost mode is selected by the controller 44, air may be directed away from the windshield for a period less than 30 seconds, in the present example, 15 seconds [(120-60)/120 * 30]. Likewise, if the ambient temperature is below 30 degrees F. and the vehicle coolant temperature is approaching 120 degree F., the controller 44 may permit air to be blow to the floor at a lower blower speed.

Although preferred embodiments of the present invention have been described, it will be apparent to a person skilled in the art that variations may be made to the system and method described herein without departing from the scope of the invention as defined by the following claims.

We claim:

1. A method for controlling a heating, ventilation and air-conditioning (HVAC) system of a vehicle to prevent fogging of a windshield of the automotive vehicle, the method comprising:

determining whether the vehicle has been recently turned "on"; and preventing the HVAC system from directing air flow toward the windshield for a first predetermined time period after the controller determines that the vehicle has recently been turned "on".

2. The method as recited in claim 1 further comprising the steps of:

receiving a plurality of input signals;

determining whether the HVAC system is dry; and if the HVAC system is dry, permitting the HVAC system to direct air flow to the windshield.

3. A method for controlling a heating, ventilation and air-conditioning (HVAC) system of a vehicle to prevent fogging of a windshield of the automotive vehicle, the method comprising:

determining whether the vehicle has been recently turned "on";

preventing the HVAC system from directing air flow toward the windshield for a first predetermined time period after a controller determines that the vehicle has recently been turned "on";

receiving a plurality of input signals;

determining whether the HVAC system is dry, comprising the controller determining that a compressor of the HVAC system was not operating prior to the vehicle being turned "off" and determining that a blower was operating for a third predetermined time period while the compressor was not operating prior to the vehicle being turned "off"; and if the HVAC system is dry, permitting the HVAC system to direct air flow to the windshield.

4. The method according to claim 3, wherein the third predetermined time period comprises approximately 30 minutes.

5. The method according to claim 3, wherein the signals comprise an ambient temperature and wherein the step of determining whether the HVAC system is dry further comprises the controller determining whether the ambient temperature is below a predetermined temperature.

6. A method for controlling a heating, ventilation and air-conditioning (HVAC) system of a vehicle to prevent fogging of a windshield of the automotive vehicle, the method comprising:

determining whether the vehicle has been recently turned "on";

preventing the HVAC system from directing air flow toward the windshield for a first predetermined time period after the controller determines that the vehicle has recently been turned "on";

receiving a plurality of input signals comprising an ambient temperature and a coolant temperature;

determining whether the HVAC system is dry comprising a controller determining whether the ambient temperature is below a first predetermined temperature and whether the vehicle coolant temperature is below a second predetermined temperature; and if the HVAC system is dry, permitting the HVAC system to direct air flow to the windshield.

7. The method according to claim 6, wherein the first temperature comprises approximately 30 degrees Fahrenheit and the second temperature comprises approximately 120 degree Fahrenheit.

8. A method for controlling a heating, ventilation and air-conditioning (HVAC) system of a vehicle to prevent fogging of a windshield of the automotive vehicle, the method comprising:

determining whether the vehicle has been recently turned "on";

preventing the HVAC system from directing air flow toward the windshield for a first predetermined time period after the controller determines that the vehicle has recently been turned "on";

receiving a plurality of input signals comprising an ambient temperature and a coolant temperature;

determining whether the HVAC system is dry wherein the step of determining whether the HVAC system is dry comprises the controller determining whether the vehicle was turned "off" for a second predetermined time period before the vehicle was most recently turned "on"; and if the HVAC system is dry, permitting the HVAC system to direct air flow to the windshield.

9. The method according to claim 8 wherein the second time period is approximately 12 hours.

10. A method for controlling a heating, ventilation and air-conditioning (HVAC) system of a vehicle to prevent fogging of a windshield of the automotive vehicle, the method comprising:

determining whether the vehicle has been recently turned "on";

preventing the HVAC system from directing air flow toward the windshield for a first predetermined time period after the controller determines that the vehicle has recently been turned "on";

receiving a plurality of input signals comprising an ambient temperature and a coolant temperature;

determining whether the HVAC system is dry comprising variably adjusting the first time period for which air is prevented from flowing toward the windshield based on the plurality of input signals; and if the HVAC system is dry, permitting the HVAC system to direct air flow to the windshield.

11. A system for controlling a heating, ventilation and air-conditioning (HVAC) system of a vehicle to prevent fogging of a windshield of the automotive vehicle, the system comprising a controller operative to determine whether the vehicle has been recently turned "on" and for preventing the HVAC system from directing air flow toward the windshield for a first predetermined time period after the controller determines that the vehicle has recently been turned "on".

12. The system as provided in claim 11, further comprising:

a plurality of sensors for sensing a plurality of input signals; and the controller being operative to determine whether the HVAC system is dry from the plurality of input signals, and if the HVAC system is dry, permitting the HVAC system to direct air flow to the windshield.

13. The system as provided in claim 12, wherein the controller determines whether the HVAC system is dry by determining whether the vehicle was turned "off" for a second predetermined time period.

14. A system for controlling a heating, ventilation and air-conditioning (HVAC) system of a vehicle to prevent fogging of a windshield of the automotive vehicle, the system comprising:

a controller operative to determine whether the vehicle has been recently turned "on" and for preventing the HVAC system from directing air flow toward the windshield for a first predetermined time period after the controller determines that the vehicle has recently been turned "on";

a plurality of sensors for sensing a plurality of input signals; and the controller being operative to determine whether the HVAC system is dry from the plurality of input signals, and if the HVAC system is dry, permitting the HVAC system to direct air flow to the windshield, wherein the controller determines whether the HVAC system is dry by determining that a compressor of the HVAC system was not operating prior to the vehicle being turned "off" and determining whether a blower was operating for a third predetermined time period while the compressor was not operating prior to the vehicle being turned "off".

15. The system as provided in claim 14, wherein the third time period is approximately 30 minutes.

16. A system for controlling a heating, ventilation and air-conditioning (HVAC) system of a vehicle to prevent fogging of a windshield of the automotive vehicle, the system comprising:

a controller operative to determine whether the vehicle has been recently turned "on" and for preventing the HVAC system from directing air flow toward the windshield for a first predetermined time period after the controller determines that the vehicle has recently been turned "on";

a plurality of sensors for sensing a plurality of input signals, wherein the input signals comprise an ambient temperature signal and a coolant temperature signal; and the controller being operative to determine whether the HVAC system is dry by determining whether the ambient temperature signal is below a first predetermined value and the coolant temperature signal is below a second predetermined value, and if the HVAC system is dry, permitting the HVAC system to direct air flow to the windshield.

17. The system as provided in claim 16, wherein the first signal value corresponds to a temperature of approximately 30 degrees Fahrenheit and the second signal value corresponds to a temperature of approximately 120 degree Fahrenheit.

18. A system for controlling a heating, ventilation and air-conditioning (HVAC) system of a vehicle to prevent fogging of a windshield of the automotive vehicle, the system comprising:

a controller operative to determine whether the vehicle has been recently turned "on" and for preventing the HVAC system from directing air flow toward the windshield for a first predetermined time period after the controller determines that the vehicle has recently been turned "on";

a plurality of sensors for sensing a plurality of input signals including an ambient temperature; and the controller being operative to determine whether the HVAC system is dry from the plurality of input signals, and if the HVAC system is dry, permitting the HVAC system to direct air flow to the windshield, wherein the controller determines whether the HVAC system is dry by determining that a compressor of the HVAC system was not operating prior to the vehicle being turned "off" and determining whether a blower was operating for a third predetermined time period while the compressor was not operating prior to the vehicle being turned "off" and determining that the ambient temperature is below a predetermined temperature.

19. A system for controlling a heating, ventilation and air-conditioning (HVAC) system of a vehicle to prevent fogging of a windshield of the automotive vehicle, the system comprising:

a controller operative to determine whether the vehicle has been recently turned "on" and for preventing the HVAC system from directing air flow toward the windshield for a first predetermined time period after the controller determines that the vehicle has recently been turned "on";

a plurality of sensors for sensing a plurality of input signals; and the controller being operative to determine whether the HVAC system is dry from the plurality of input signals, and if the HVAC system is dry, permitting the HVAC system to direct air flow to the windshield, wherein the controller determines whether the HVAC system is dry by determining whether the vehicle was turned "off" for a second predetermined time period.

* * * * *